United States Patent
Lofberg et al.

(10) Patent No.: US 10,252,909 B2
(45) Date of Patent: Apr. 9, 2019

(54) METHOD FOR DRY REFORMING OF AT LEAST ONE ALKANE

(71) Applicants: UNIVERSITE DES SCIENCES ET TECHNOLOGIES DE LILLE 1, Villeneuve d'Ascq (FR); CENTRE NATIONAL DE LA RECHERCHE SCIENTIFIQUE (C.N.R.S.), Paris (FR)

(72) Inventors: Axel Lofberg, Lille (FR); Louise Duhamel Jalowiecki, Villeneuve d'Ascq (FR); Jesus Guerrero, Villeneuve d'Ascq (FR)

(73) Assignees: Universite Des Sciences et Technologies De Lille 1, Villeneuve D'ascq (FR); Centre National De La Recherche Scientifique (C.N.R.S.), Paris (FR)

( * ) Notice: Subject to any disclaimer, the term of this patent is extended or adjusted under 35 U.S.C. 154(b) by 0 days.

(21) Appl. No.: 15/307,311

(22) PCT Filed: Apr. 27, 2015

(86) PCT No.: PCT/FR2015/051141
§ 371 (c)(1),
(2) Date: Oct. 27, 2016

(87) PCT Pub. No.: WO2015/166182
PCT Pub. Date: Nov. 5, 2015

(65) Prior Publication Data
US 2017/0050845 A1    Feb. 23, 2017

(30) Foreign Application Priority Data

Apr. 29, 2014   (FR) ...................... 14 53844

(51) Int. Cl.
| | |
|---|---|
| *C01B 3/40* | (2006.01) |
| *B01J 23/755* | (2006.01) |
| *B01J 23/75* | (2006.01) |
| *B01J 23/10* | (2006.01) |
| *C01B 3/26* | (2006.01) |
| *C01B 3/38* | (2006.01) |

(52) U.S. Cl.
CPC ............... *C01B 3/40* (2013.01); *B01J 23/10* (2013.01); *B01J 23/75* (2013.01); *B01J 23/755* (2013.01); *C01B 3/26* (2013.01); *C01B 3/38* (2013.01); *C01B 2203/0238* (2013.01); *C01B 2203/0277* (2013.01); *C01B 2203/1052* (2013.01); *C01B 2203/1058* (2013.01); *C01B 2203/1082* (2013.01); *C01B 2203/1241* (2013.01); *Y02P 20/52* (2015.11)

(58) Field of Classification Search
CPC ....................................................... C01B 3/40
See application file for complete search history.

(56) References Cited

U.S. PATENT DOCUMENTS

| | | | |
|---|---|---|---|
| 2002/0010220 A1* | 1/2002 | Zeng .................. | C01B 3/36 518/703 |
| 2005/0129995 A1 | 6/2005 | Kato et al. | |
| 2010/0274060 A1 | 10/2010 | Olah et al. | |
| 2016/0158734 A1* | 6/2016 | Shen .................. | C10J 3/725 502/326 |

FOREIGN PATENT DOCUMENTS

| | | | |
|---|---|---|---|
| EP | 0995715 A1 | | 4/2000 |
| WO | WO 2015/020862 | * | 2/2015 |

OTHER PUBLICATIONS

International Search Report of PCT/FR2015/051141 dated Aug. 3, 2015.

* cited by examiner

*Primary Examiner* — Douglas B Call
(74) *Attorney, Agent, or Firm* — Amster, Rothstein & Ebenstein LLP

(57) ABSTRACT

The present invention relates to a method for dry reforming of at least one alkane carried out in at least one reaction chamber, preferably with a catalytic bed, having a stream of gas passing through same. According to the invention, said at least one reaction chamber comprises a catalytic solid which is cyclically and alternatively exposed to a stream of at least one alkane and a stream containing carbon dioxide, such that said catalytic solid is used as an oxidation vector.

11 Claims, No Drawings

METHOD FOR DRY REFORMING OF AT LEAST ONE ALKANE

TECHNICAL FIELD OF THE INVENTION

The invention relates to a method for the dry reforming of alkanes, in particular the reforming of methane. The dry reforming of methane (CH4) is a means of recycling, hence its usefulness. This method uses two greenhouse gases, methane and carbon dioxide (CO2), and produces a syngas comprising dihydrogen (H2) and carbon monoxide (CO).

STATE OF THE ART

Traditional reaction chambers used for the dry reforming of methane generally consist of a fixed bed catalytic chamber exposed to a stream of gas consisting of a possibly diluted mixture of methane and carbon dioxide. The reaction is carried out at high temperature (typically 700-900° C.) in order to overcome the thermodynamic limits related to this endothermic reaction.

The dry reforming of methane has the advantage in that it consumes carbon dioxide, a gas considerably contributing to the greenhouse effect. Nevertheless, the disadvantages are: (i) it results in a lower H2/CO ratio than other reforming methods (partial oxidation and/or steam reforming), (ii) it is endothermic as opposed to partial oxidation reforming. The main difficulties consist of the formation of coke leading to the rapid deactivation of catalysts due to the high operating temperatures and the simultaneous presence of CO2 (reagent) and hydrogen (product) resulting, by the reverse water gas-shift reaction, in a reduction in selectivity.

Therefore, research centred on the catalysts themselves, in order to make them active at the lowest possible temperatures, more selective and more resistant to coking.

Other research centred on the mode of contact between reagents and catalysts. In a manner known per se, two approaches have been described in the literature:

Veser et al. proposed a system using a solid oxygen vector based on the chemical loop method for the oxidation of methane. In this approach, the oxygen is replaced by CO2. Although called Chemical Loop Dry Reforming, this method does not aim at the production of syngas, or even hydrogen, but the total oxidation of the methane into CO2 and H2O for the production of heat and CO.

The documents known on this subject are: 1a) Michelle Najera, Rahul Solunke, Todd Gardner, Götz Veser, Carbon capture and utilization via chemical looping dry reforming, Chemical Engineering Research and Design 89 (2011), 1533-1543, http://dx.doi.org/10.1016/j.cherd.2010.12.017; 1b) Saurabh Bhaysar, Michelle Najera, Götz Veser, Chemical Looping Dry Reforming as Novel, Intensified Process for CO2 Activation, Chem. Eng. Technol. 35, No 7 (2012), 1281-1290.

Other work is based on a periodic operation for the dry reforming of methane. Thereby, in the reaction phase with methane, the solid catalyst completely leads to the formation of solid carbon and hydrogen (coking). The carbon is then re-oxidised by the CO2 in the second phase of the reaction. In such conditions, the sold acts as a coking catalyst and carbon vector. The method aims at the production of pure hydrogen. The following documents describe this work: 2a) Eakkapon Promaros, Suttichai Assabumrungrat, Navadol Laosiripojana, Piyasan Praserthdam, Tomohiko Tagawa and Shigeo Goto, Carbon dioxide reforming of methane under periodic operation, Korean J. Chem. Eng. 24. 24(1) (2007), 44-50; 2b) S. Assabumrungrat, S. Charoenseri, N. Laosiripojana, W. Kiatkittipong, P. Praserthdam, Effect of oxygen addition on catalytic performance of Ni/SiO2-MgO toward carbon dioxide reforming of methane under periodic operation, International Journal of Hydrogen Energy 34 (2009), 6211-6220, http://dx.doi.org/10.1016/j.ijhydene.2009.05.128; 2c) B. Pholjaroen, N. Laosiripojana, P. Praserthdam, S. Assabumrungrat, Reactivity of Ni/SiO2-MgO toward carbon dioxide reforming of methane under steady state and periodic operations, Journal of Industrial and Engineering Chemistry 15 (2009), 488-497.

It is also interesting to mention the very recent work by Sadykov et al. (3) illustrating the use of the pulse technique in the study of the kinetics of dry reforming. The pulse method consists of the injection on one of the reagents by means of successive pulses of this reagent in order to assess the reaction capacity (in particular the available oxygen in a solid as well as the reaction kinetics). Another reagent is then injected in the same way. In this work, the separate supply of two reagents is only used to determine the reaction mechanisms in order to improve the performance of the dry reforming reaction in the traditional operating conditions (co-supply). The documents concern V. Sadykov et al., "Mechanism of CH4 dry reforming by pulse microcalorimetry: Metal nanoparticles on perovskite/fluorite supports with high oxygen mobility", Thermochim. Acta (2013), http://dx.doi.org/10.1016/j.tca.2013.01.034.

None of these methods suggests using a mechanism in which the solid is reduced and periodically oxidised for the production of syngas.

In addition, a great many documents-patents are available on dry reforming. By way of illustration, patent EP 0692451 describes a catalyst for the dry reforming of methane into syngas. The catalyst is characteristic in this invention.

In addition, patent application WO 2012/167351 involves a specific catalyst for the production of hydrogen by the dry reforming of carbon dioxide.

It is also of interest to note patent application WO 2013/068905 describing the production of a reforming catalyst, and the reforming of methane. The preparation of the catalyst is of major importance in the reforming reaction.

None of the known solutions simultaneously avoid the two major disadvantages inherent in catalytic reforming, that is, the reverse water gas-shift reaction and the coking of the catalytic solid. More specifically, the low selectivity due to the reverse water gas-shift reaction consumes a large part of the dihydrogen formed and, in addition, the rapid deactivation of the catalyst by the coke formed and deposited on the catalytic solid are two major problems in dry reforming.

In other terms, syngas is not currently produced, in a favourable manner, by dry reforming, in particular due to these disadvantages.

DISCLOSURE OF THE INVENTION

The invention aims at overcoming the disadvantages of the state of the technique, in particular to avoid the reverse water gas-shift reaction as well the coking while obtaining an H2/CO ratio of about two at the end of the methane reaction phase.

To do this, according to a first aspect of the invention, a dry reforming method is proposed with at least one alkane, made in at least one reaction chamber exposed to a stream of gas. According to the invention, said at least one reaction chamber comprises a catalytic solid which is cyclically and alternatively exposed to a stream of at least one alkane and a stream containing carbon dioxide, such that said catalytic solid is used as an oxidation vector, in that said catalytic solid consists of Me1-Ox1-Ox2 where: Me1 is an element that can not be re-oxidised under carbon dioxide; Ox1 is an oxide that can be reduced under alkane and can be re-oxidised under carbon dioxide; Ox2 is an oxide that is inert with respect to said alkane and carbon.

Advantageously, Ox2 is chosen from among $Al_2O_3$, MgO, $Ta_2O_5$, $Y_2O_3$, $ZrO_2$.

In addition, the ratio Ox2/(Me1+Ox1) is advantageously found between 0 and 100.

Said at least one reaction chamber may be a catalytic reaction chamber, preferably a fixed-bed catalytic reaction chamber. The fixed-bed may be formed by grains of catalyst(s) or by the surface of solid objects such as the walls of the reaction chamber or an insert.

Advantageously, a physical mechanism is used here involving an oxygen vector in a periodic manner for the reforming of an alkane by carbon dioxide, for the production of syngas.

Therefore, such a method combines the advantage of dry reforming with respect to other means of reforming, that is, the consumption of a molecule with a noteworthy greenhouse effect, with stable operation and a high selectivity in syngas. The recovery of the gases from each phase in the cycle provides, on the one hand, a hydrogen-rich syngas (as opposed to the continuous co-supply method) and, on the other hand, a gas rich in carbon monoxide of industrial use.

According to one interesting aspect of the invention, the alkane is methane ($CH_4$).

Preferentially, the mass ratio Me1/Ox1 is approximately found between 0 and 0.9.

In addition, Me1 is chosen from among one of the following elements taken alone or in combination: Ag, Au, Co, Cr, Ir, La, Mn, Ni, Os, Pd, Pt, Re, Rh, Ru, Sc, W, Mo.

Preferentially, the element Me1 is initially used in oxide or hydroxide form.

In addition, Ox1 is chosen from among an oxide of the following elements taken alone or in combination: Ce, Fe, Nb, Ti, W, Mo. Ox1 may contain V and/or Z. It may contain up to 30% in weight of one of these elements.

In addition, said catalytic solid may, at the same time, be exposed to alkane, preferentially to methane, and carbon dioxide. The time considered is about one minute.

According to one preferred embodiment of the invention, said catalytic solid comprises a $CeO_2$ support including Nickel and/or Cobalt, preferably in a ratio of 8.7% in weight.

The temperature used in this method may be between 650° C. and 850° C.

In an interesting manner, up to 80% of the carbon dioxide injected is part of the stream of alkane.

DETAILED DESCRIPTION OF A MODE TO CARRY OUT THE INVENTION

As already mentioned, the present invention, concerns, according to one of its aspects, a method for dry reforming in which the catalytic solid is exposed in an alternate and repeated manner to each of the dry reforming reagents (methane and carbon dioxide) and where it is used as an oxygen vector. Initially, the solid reacts with the methane to form carbon monoxide and dihydrogen. Then, it reacts with the carbon dioxide to recharge in oxygen. During this second phase, any possible carbonated residues are re-oxidised by the carbon dioxide. Since the solid is regenerated during each cycle, de-activation by coking is avoided. The produced hydrogen is never in contact with the carbon dioxide (reagent), thereby avoiding the reverse water gas-shift reaction.

The activity and selectivity of the solid are assured by the presence of a reducible oxide ($CeO_2$ in the example) serving as the oxygen vector, and a metal (Ni, Co in the examples) that is not oxidised in the conditions used in the method, assuring the activation of the methane.

Such a reaction thereby makes a catalytic solid undergo repeated cycles of oxidation-reduction by alternatively exposing it to methane and carbon dioxide. In practice, this is obtained by supplying the fixed-bed reactor in a periodic manner. For this type of reaction chamber, the reaction temperature should necessarily be identical in the two stages of the periodic method.

It consists of a simple method to carry out this type of reaction on both the laboratory and industrial scales. In an interesting manner, the method may be used with a circulating fluidised bed. In this case, the solid is carried between two distinct reactors where it is exposed to each of the reagents independently. Moreover, this method has the advantage that is can most effectively optimise each of the reaction phases and thereby a still more effective use of the invention.

The type of analytic tool used (on-line mass spectrometry) requires working with reduced concentration of reagents (typically 5 to 25 in a quantitative manner, up to 50% in a less quantitative manner). Nevertheless, the defended concept should be perfectly possible with streams of pure gases.

The principle of the method according to the invention consists of using a solid especially with the following specific properties:

1. It should present a capacity for storage and oxygen transfer;
2. It should enable the activation of the methane;
3. It should, in the conditions used, selectively lead to the syngas ($CH_4+Sol\text{-}O \rightarrow CO+2H_2+Sol\text{-}R$) and not total oxidation ($CH_4+4Sol\text{-}O \rightarrow CO_2+2H_2O+4Sol\text{-}R$) (Sol-O and Sol-R represent the oxidised and reduced solid, respectively). The formation of derivatives should also be limited (for example, alkenes). The formation of solid carbon ($CH_4 \rightarrow C+2H_2$ or $2CO \rightarrow CO_2+C$) should be limited as far as possible but is not prohibitive as long as the solid is constantly regenerated by the $CO_2+C \rightarrow 2CO$ reaction;
4. The oxygen storage capacity should be replenished by re-oxidation by $CO_2$.

In an interesting manner, the composition of a catalytic solid may be generalised as follows: Me1-Ox1-Ox2; where:

Me1 is an element that cannot be re-oxidised under carbon dioxide. Me1 may be one of the following elements or a combination of the following elements: Ag, Au, Co, Cr, Ir, La, Mn, Ni, Os, Pd, Pt, Re, Rh, Ru, Sc, W, Mo. Initially, Me1 may be in a reduced form or in any form of oxide or hydroxide, or a mixture of both, reducible under methane. The selection of elements proposed for Me1 is based on the thermodynamics of the reducibility of the oxide under methane and that of the re-oxidation of the metal reduced by the carbon dioxide. The elements in question should also show a certain ability to activate methane, for any type of reaction.

Ox1 is an oxide that is reducible in methane and can be re-oxidised in carbon dioxide. The Ox1 elements are chosen so that the thermodynamics (in the temperature conditions proposed) of the partial oxidation of the methane into carbon monoxide and dihydrogen is more favourable than the total oxidation into carbon dioxide and water. Ox1 may therefore be an oxide of the following elements or an oxide from a combination of the following elements: Ce, Fe, Nb, Ti, W, Mo. The oxide may also contain less than 30% V and/or Zr associated with the previous elements. Although these two elements don't directly comply with the thermodynamic criteria or reducibility and selectivity, they are known to affect the properties of solids based on the oxides proposed for Ox1.

The oxides Al2O3, MgO, Ta2O5, Y2O3, ZrO2 may be used as supports of solid reagents in order to, for example, improve: the dispersion, the reactivity or the chemical and mechanical stability. Ox2 may thereby be chosen from among Al2O3, MgO, Ta2O5, Y2O3, ZrO2.

The mass proportion between Me1/Ox1 may vary from 0 to 0.9; that of Ox2/(Me1+Ox1) from 0 to 100.

In general, conditions 1 and 4 should be provided by a reducible oxide. Condition 2 may be provided by this same oxide or by another solid phase associated with the former, for example, a metal supported on the reducible oxide. Condition 3 is determined by the type of oxide or all of the present phases as well as the operating conditions.

Successful trials have been obtained using a cerium oxide (CeO) solid associated with metal particles (Ni, Co) supported on this oxide. The support acts as an oxygen vector by oxidation and reduction in CO2 and CH4, respectively. The metal enables the good activation of the methane and thereby high conversions. It should be noted that the metals mentioned do not re-oxidise in the presence of CO2 in the reaction conditions as it has been possible to check by thermodynamic calculations. In these conditions, the selectivity during the oxidation of the methane is excellent (refer to examples) while in oxidised form (for example by dioxygen) these same elements lead to the total oxidation of the methane in the same operating conditions. Moreover, the supported Ni oxide catalysts are well known for the total oxidation of methane in a chemical loop for the production of heat.

The proposed method has been tested with laboratory-produced solids. The behaviour of the Ni catalyst supported on CeO2 has been verified using a laboratory-prepared support as well as a commercial support (Aldrich). The performance in terms of activity (conversion of the methane and carbon dioxide) are lower but this may be attributed to the reduced specific area of the commercial support. However, in terms of selectivity, the performance has validated the principle of the periodic method independently of the origin of the support. The same is true for the performance of the supported cobalt solid, an element known for its ability to activate methane.

The following tables present several representative results. The first table provides: the type of solid used (the type of Ox1 support used and its source; the type of Me1 metal, the mass ratio Me1/Ox1 as well as the reaction conditions (the amount of solid used, the reaction temperature, the methane and carbon dioxide concentrations used, the total gas inflow, the periodic operating conditions (length of the cycles)). The second table provides: during the exposure of the methane, the conversion of the methane, the measured H2/CO ratio, the percentage of converted methane leading to the formation of solid carbon; during the exposure of the carbon dioxide, the conversion of the carbon dioxide, the CO/(converted CO2) ratio.

Ideally, the H2/CO ratio should be equal to 2. A higher value indicates the formation of solid carbon, a lower value indicates the presence of a reverse water-gas shift reaction. The percentage of carbon formed should be as low as possible. Ideally, the CO/CO2 ratio should be equal to 1. A higher value indicates the oxidation of the carbon deposited on the support. The conversion of methane and carbon dioxide should be equivalent.

Each experiment consists of 12 full cycles. The values indicated are integrated averages for the last 6 cycles carried out. Experiments with 60 cycles have also been carried out and demonstrate the excellent stability of the behaviour of the solids (examples 1, 2, 3).

The results show that, in very extensive operating conditions, both in the composition of the reaction streams, temperature, quantities and the type of solid, the performance of the system is close to that of the ideal in terms of selectivity (CO/H2). The results differ only in terms of reactivity (conversion) and more or less high percentage of methane transformed from solid carbon.

The results obtained show the robustness of this method when the above conditions are respected, as well as its adaptability to vast operating conditions. They also demonstrate great flexibility for optimisation, in particular by:

The control of the quantity and type of metallic phase, or even multi-metallic phase, by associating several elements in order to optimise the activation of the methane and CO2, The control of the oxygen supply from the support by modifying its type (oxides, mixed oxides, doped oxides), Control of the activation of the CO2 by modifications in the support (impregnation, doping).

In principle, the method according to the invention is well adapted for the reforming of methane without excluding other alkanes (for example ethane, propane, etc.).

The dry reforming of methane involves the consumption of an equivalent of CH4 for an equivalent of CO2. The invention foresees a separate supply of these two reagents in order to optimise the performance of the catalysts used. Nevertheless, without going beyond the invention, it is possible to supply part of the CO2 simultaneously with the methane (co-supply) while maintaining part of the advantages of this method (solid carbon eliminated during each cycle, lower contribution of the reverse water-gas shift reaction). The portion CO2 supplied with the alkane should in any case not exceed 80% of the total CO2 required for dry reforming.

TABLE 1

Experimental details of the examples

| Example | CeO2 | Metal | Metal (% weight) | $m_{sol}$ (g) | T (° C.) | Reagent concentration | Cycles (number) | Inflow (cc/min) | Cycle |
|---|---|---|---|---|---|---|---|---|---|
| 1 | produced | Ni | 8.7 | 0.40 | 800 | 25% CH$_4$<br>25% CO$_2$ | 60 | 100 | 1 min. CH$_4$<br>1 min. CO$_2$ |
| 2 | produced | Ni | 8.7 | 0.20 | 800 | 5% CH$_4$<br>5% CO$_2$ | 60 | 100 | 1 min. CH$_4$<br>1 min. CO$_2$ |
| 3 | produced | Co | 8.7 | 0.20 | 800 | 5% CH$_4$<br>5% CO$_2$ | 60 | 100 | 1 min. CH$_4$<br>1 min. CO$_2$ |
| 4 | produced | Ni | 2.0 | 0.20 | 700 | 5% CH$_4$<br>5% CO$_2$ | 12 | 100 | 1 min. CH$_4$<br>1 min. CO$_2$ |

TABLE 1-continued

Experimental details of the examples

| Example | CeO2 | Metal | Metal (% weight) | $m_{sol}$ (g) | T (° C.) | Reagent concentration | Cycles (number) | Inflow (cc/min) | Cycle |
|---|---|---|---|---|---|---|---|---|---|
| 5 | produced | Ni | 8.7 | 0.20 | 700 | 5% $CH_4$ 5% $CO_2$ | 12 | 100 | 1 min. $CH_4$ 1 min. $CO_2$ |
| 6 | produced | Ni | 8.7 | 0.20 | 800 | 5% $CH_4$ 5% $CO_2$ | 12 | 100 | 1 min. $CH_4$ 1 min. $CO_2$ |
| 7 | produced | Ni | 8.7 | 0.20 | 750 | 5% $CH_4$ 5% $CO_2$ | 12 | 100 | 1 min. $CH_4$ 1 min. $CO_2$ |
| 8 | produced | Ni | 8.7 | 0.20 | 700 | 5% $CH_4$ 5% $CO_2$ | 12 | 100 | 1 min. $CH_4$ 1 min. $CO_2$ |
| 9 | produced | Ni | 8.7 | 0.20 | 650 | 5% $CH_4$ 5% $CO_2$ | 12 | 50 | 1 min. $CH_4$ 1 min. $CO_2$ |
| 10 | Commercial | Ni | 8.7 | 0.20 | 800 | 5% $CH_4$ 5% $CO_2$ | 12 | 100 | 1 min. $CH_4$ 1 min. $CO_2$ |
| 11 | produced | Co | 8.7 | 0.20 | 800 | 5% $CH_4$ 5% $CO_2$ | 12 | 100 | 1 min. $CH_4$ 1 min. $CO_2$ |
| 12 | produced | Co | 8.7 | 0.20 | 750 | 5% $CH_4$ 5% $CO_2$ | 12 | 100 | 1 min. $CH_4$ 1 min. $CO_2$ |
| 13 | produced | Co | 8.7 | 0.20 | 700 | 5% $CH_4$ 5% $CO_2$ | 12 | 100 | 1 min. $CH_4$ 1 min. $CO_2$ |

TABLE 2

Experimental results of the examples

| Example | Conversion CH4 (%) ± 1 | H2/C0 ± 0.2 | $C_{deposited}/C_{conv.}$ (%) ± 2 | Conversion CO2 (%) ± 1 | CO/$CO_{2conv.}$ ± 0.1 |
|---|---|---|---|---|---|
| 1 | 54 | 2.2 | 3 | 60 | 1.0 |
| 2 | 84 | 2.0 | 3 | 83 | 1.0 |
| 3 | 69 | 2.0 | <2 | 74 | 1.0 |
| 4 | 38 | 1.9 | <2 | 37 | 1.2 |
| 5 | 68 | 1.9 | <2 | 71 | 1.1 |
| 6 | 88 | 2.1 | 5 | 87 | 1.0 |
| 7 | 80 | 2.0 | 1 | 79 | 1.0 |
| 8 | 65 | 2.1 | 5 | 65 | 1.0 |
| 9 | 41 | 2.1 | 1 | 43 | 1.1 |
| 10 | 13 | 1.8 | <2 | 22 | 0.9 |
| 11 | 77 | 2.1 | <2 | 84 | 1.0 |
| 12 | 68 | 2.1 | 2 | 71 | 1.0 |
| 13 | 51 | 2.1 | <2 | 52 | 1.0 |

It is therefore interesting to note that the method according to the invention avoids the reverse water gas-shift reaction between carbon dioxide (dry reforming reagent) and dihydrogen (dry reforming product), a reaction that affects the selectivity of the method when the two reagents are simultaneously supplied. The coking of the catalyst in contact with the methane may also be considerably reduced or even cancelled. The periodic recycling of the catalytic solid enables the re-oxidation of the material and therefore maintains performance.

In an especially interesting manner, the method according invention allows for the valorisation of the biogas. Other more complex sources, such as, for example, mixtures with other alkanes or alkenes from natural gas, may also be valorised by the method according to the invention.

The invention claimed is:

1. Method for dry reforming of at least one alkane, wherein said dry reforming of at least one alkane is carried out in at least one reaction chamber exposed to a stream of gas, wherein said at least one reaction chamber comprises a catalytic solid, wherein said method comprises cyclically and alternatively exposing said catalytic solid (i) to a stream containing an alkane and (ii) to a stream containing carbon dioxide, wherein said catalytic solid is an oxidation vector and consists of Me1-Ox1-Ox2 where: Me1 is an element selected from the group consisting of Ag, Au, Co, Cr, Ir, La, Mn, Ni, Os, Pd, Pt, Re, Rh, Ru, Sc, W, Mo and any combination thereof and, wherein Me1 cannot be oxidised in carbon dioxide; Ox1 is a reducible oxide in alkane and can be re-oxidised in carbon dioxide and wherein Ox1 does not contain Fe; Ox2 is an inert oxide with respect to said alkane and carbon.

2. The method according to claim 1, wherein said Ox2 is chosen from among $Al_2O_3$, MgO, $Ta_2O_5$, $Y_2O_3$, $ZrO_2$ and in that Ox2/(Me1+Ox1) mass ratio is between 0 and 100.

3. The method according to claim 1, wherein said at least one reaction chamber is a catalytic bed reaction chamber.

4. The method according to claim 1, wherein said at least one reaction chamber is a fixed catalytic bed reaction chamber.

5. The method according to claim 1, wherein the alkane is methane.

6. The method according to claim 1 wherein Me1/Ox1 mass ratio is approximately between 0 and 0.9.

7. The method according to claim 1, wherein the element Me1 is initially used in oxide or hydroxide form.

8. The method according to claim 1, wherein Ox1 is chosen from among an oxide of the following elements taken alone or in combination: Ce, Nb, Ti, W, Mo.

9. The method according to claim 1, wherein Ox1 may contain V and/or Zr.

10. The method according to claim 1, wherein said catalytic solid comprises a $CeO_2$ support including Ni and/or Co in a ratio of 8.7% in weight.

11. The method according to claim 1, wherein up to 80% of injected carbon dioxide is part of the stream of alkane.

* * * * *